(12) United States Patent
Croskery et al.

(10) Patent No.: US 10,797,818 B1
(45) Date of Patent: Oct. 6, 2020

(54) DYNAMIC DATA-DRIVEN POWER SCALING IN AN OPTICAL NODE AND NETWORK

(71) Applicant: Ciena Corporation, Hanover, MD (US)

(72) Inventors: Andrew Croskery, Ottawa (CA); David Miedema, Ottawa (CA); Edward Chen, Ottawa (CA); Radmila Kovacevic, Carp (CA); Rejean Tremblay, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/511,372

(22) Filed: Jul. 15, 2019

(51) Int. Cl.
| | |
|---|---|
| *H04J 14/02* | (2006.01) |
| *H04B 10/079* | (2013.01) |
| *H04L 1/00* | (2006.01) |

(52) U.S. Cl.
CPC .... *H04J 14/0212* (2013.01); *H04B 10/07955* (2013.01); *H04L 1/0026* (2013.01); *H04J 2203/003* (2013.01); *H04J 2203/0005* (2013.01)

(58) Field of Classification Search
CPC combination set(s) only.
See application file for complete search history.

(56) References Cited

U.S. PATENT DOCUMENTS

| | | | |
|---|---|---|---|
| 8,364,036 B2 | 1/2013 | Boertjes et al. | |
| 9,060,215 B2 | 6/2015 | Miedema | |
| 9,252,913 B2 | 2/2016 | Al Sayeed et al. | |
| 9,686,176 B2 | 6/2017 | Traxler et al. | |
| 9,768,870 B2 | 9/2017 | Miedema et al. | |
| 9,768,902 B2 | 9/2017 | Al Sayeed et al. | |
| 9,819,565 B2 | 11/2017 | Djukic et al. | |
| 9,986,317 B1 | 5/2018 | Al Sayeed et al. | |
| 10,148,384 B2 | 12/2018 | Swinkels et al. | |
| 10,200,770 B2 | 2/2019 | Swinkels et al. | |
| 2002/0048066 A1* | 4/2002 | Antoniades | H04J 14/0228 398/82 |
| 2007/0206512 A1 | 9/2007 | Hinds et al. | |
| 2007/0230872 A1* | 10/2007 | Suzuki | G02B 6/4214 385/48 |
| 2009/0274457 A1* | 11/2009 | Cahill | H04B 10/07955 398/38 |
| 2011/0255443 A1 | 10/2011 | Ashwood-Smith et al. | |
| 2012/0321299 A1* | 12/2012 | Oguma | H04J 14/0227 398/34 |

(Continued)

*Primary Examiner* — Omar S Ismail
(74) *Attorney, Agent, or Firm* — Clements Bernard Walker; Lawrence A. Baratta, Jr.; Christopher L. Bernard

(57) ABSTRACT

Systems and methods include obtaining power measurements from one or more first components in an optical node and store the power measurements at corresponding vertices in a graph that describes the optical node; obtaining calibration data from a plurality of second components in the optical node and utilize the calibration data to determine an optical gain or an optical loss through an associated arc in the graph; and determining an optical power at any point in the optical node via traversing the graph, for any of configuration and operation of the optical node. The graph includes the vertices that are points in the optical node where there is a need for optical power, the arcs that are connections through the optical node where the optical power has the optical gain or the optical loss, and optical channels and their associated optical spectrum.

18 Claims, 6 Drawing Sheets

(56) References Cited

U.S. PATENT DOCUMENTS

| | | | |
|---|---|---|---|
| 2014/0112660 A1* | 4/2014 | Al Sayeed | H04J 14/0221 398/38 |
| 2014/0328583 A1* | 11/2014 | Al Sayeed | H04J 14/0202 398/7 |
| 2016/0191188 A1* | 6/2016 | Butler | H04J 14/0212 398/48 |
| 2016/0316281 A1* | 10/2016 | Keyworth | H04J 14/0217 |
| 2017/0117983 A1* | 4/2017 | Al Sayeed | H04J 14/0221 |
| 2018/0084063 A1 | 3/2018 | Miedema | |

* cited by examiner

US 10,797,818 B1

DYNAMIC DATA-DRIVEN POWER SCALING IN AN OPTICAL NODE AND NETWORK

FIELD OF THE DISCLOSURE

The present disclosure generally relates to optical networking. More particularly, the present disclosure relates to systems and methods for dynamic data-driven power scaling in an optical node and network.

BACKGROUND OF THE DISCLOSURE

Optical (photonic) networks are utilized to support the transmission of data between locations such as in long haul, regional, metro, campus, and/or data center interconnect networks. Physical functions in an optical network include transmission, amplification, regeneration, and reception of optical signals. Optical networks are physically realized by hardware components that may be implemented as circuit packs, modules, blades, rack-mounted units, "pizza boxes," etc. For example, circuit packs, modules, blades, etc. may be inserted into a chassis (shelf) while rack-mounted units, pizza boxes, etc. are self-contained units. Other approaches may also be used. As described herein, the general term of "circuit pack" is utilized to refer to a hardware component associated with components in an optical network and this term is meant to encompass any physical form, i.e., not just a chassis-based implementation.

Optical networks are proliferating in deployment as well as the customers (e.g., traditional customers include service (telecom) providers but are expanding to Global Content Networks (GCN) and the like. Accordingly, there is an increase in the types and variations of photonic circuit packs as well as the way they are deployed. It is quite typical for a circuit pack designed with one specific planned deployment to be reused in a different configuration to meet different needs. As technology has advanced and needs have changed, photonic components are often packaged differently as well to meet different objectives.

For example, a circuit pack reuse includes a Direction Independent Access (DIA) configuration which reuses a Wavelength Selective Switch (WSS) circuit pack originally designed for a Reconfigurable Optical Add-Drop Multiplexer (ROADM) configurations to give customers directionless capabilities. DIA allows a user to determine the optical direction of a channel out of a node via software and not a physical connection. As well a Selective MUX-DEMUX (SMD) circuit pack, originally used to give customers colorless flexibility has been reused in submarine applications for spectrum sharing. An example of repackaging includes a ROADM Line Amplifier (RLA) which combines a WSS module with Mid-Stage Line Amplifier (MLA) and Line Interface Module (LIM).

One of the main problems with supporting new circuit packs, or reconfigurations of existing circuit packs, is the ability to obtain control power measurements to control the channels. Further, another problem includes software configuration to support the new circuit packs or reconfigurations. There have been techniques to reduce the amount of software code churn required when supporting new circuit packs, but the support of existing cards in ad-hoc configurations is not possible. The conventional approach is to write software code specific to every photonic configuration that is supported by a circuit pack so that channels can be controlled through them.

Disadvantageously, whenever there is a desire to reconfigure circuit packs in a different way, there is a requirement for a new software release. Additionally, whenever a new circuit pack is developed, it is only supported in a select number of configurations, with additional configurations supported in later releases, usually driven by customer demand.

BRIEF SUMMARY OF THE DISCLOSURE

In an embodiment, an apparatus includes a processor and memory storing instructions that, when executed, cause the processor to obtain power measurements from one or more first components in an optical node and store the power measurements at corresponding vertices in a graph that describes the optical node, obtain calibration data from a plurality of second components in the optical node and utilize the calibration data to determine an optical gain or an optical loss through an associated arc in the graph, and determine an optical power at any point in the optical node via traversing the graph, for any of configuration and operation of the optical node. The graph can include the vertices that are points in the optical node where there is a need for optical power, the arcs that are connections through the optical node where the optical power has the optical gain or the optical loss, and optical channels and their associated optical spectrum. The power measurements can include per optical channel power and total optical power, and wherein the graph further includes data denoting optical channels present and their associated optical spectrum. An amplifier component of the second components can be modeled by an arc with an optical gain, a fiber connection of the second components is modeled by an arc with an optical loss based on fiber attenuation, and a circuit pack of the second components is modeled by an arc with an optical loss based on insertion loss.

The power measurements can include at least two power measurements, and wherein the optical power is determined at a point utilized each of the at least two power measurements and traversing the graph accordingly and a scaling error is used to determine which of the at least two power measurements is used. The power measurements can include at least two power measurements with a first measurement and a second measurement, and wherein the memory storing instructions that, when executed, cause the processor to determine the optical power at a point by traversing the graph from the first measurement to the point and traversing the graph from the second measurement to the point, and determine an indication of improper operation of the node based on a divergence of the determined optical power based on the first measurement and the second measurement. The calibration data can include any of insertion loss, gain, attenuation, and fiber loss.

In another embodiment, a non-transitory computer-readable medium comprising instructions that, when executed, cause a processor to perform the steps of obtaining power measurements from one or more first components in an optical node and store the power measurements at corresponding vertices in a graph that describes the optical node; obtaining calibration data from a plurality of second components in the optical node and utilize the calibration data to determine an optical gain or an optical loss through an associated arc in the graph; and determining an optical power at any point in the optical node via traversing the graph, for any of configuration and operation of the optical node. The graph can include the vertices that are points in the optical node where there is a need for optical power, the arcs that are connections through the optical node where the optical power has the optical gain or the optical loss, and optical channels and their associated optical spectrum. The power measurements can include per optical channel power and total optical power, and wherein the graph further includes data denoting optical channels present and their associated optical spectrum. An amplifier component of the second components can be modeled by an arc with an optical gain, a fiber connection of the second components is modeled by an arc with an optical loss based on fiber attenuation, and a circuit pack of the second components is modeled by an arc with an optical loss based on insertion loss.

The power measurements can include at least two power measurements, and wherein the optical power is determined at a point utilized each of the at least two power measurements and traversing the graph accordingly and a scaling error is used to determine which of the at least two power measurements is used. The power measurements can include at least two power measurements with a first measurement and a second measurement, and wherein the instructions that, when executed, further cause the processor to perform the steps of determining the optical power at a point by traversing the graph from the first measurement to the point and traversing the graph from the second measurement to the point; and determining an indication of improper operation of the node based on a divergence of the determined optical power based on the first measurement and the second measurement. The calibration data can include any of insertion loss, gain, attenuation, and fiber loss.

In a further embodiment, a method includes obtaining power measurements from one or more first components in an optical node and store the power measurements at corresponding vertices in a graph that describes the optical node; obtaining calibration data from a plurality of second components in the optical node and utilize the calibration data to determine an optical gain or an optical loss through an associated arc in the graph; and determining an optical power at any point in the optical node via traversing the graph, for any of configuration and operation of the optical node. The graph can include the vertices that are points in the optical node where there is a need for optical power, the arcs that are connections through the optical node where the optical power has the optical gain or the optical loss, and optical channels and their associated optical spectrum. The power measurements can include per optical channel power and total optical power, and wherein the graph further includes data denoting optical channels present and their associated optical spectrum. An amplifier component of the second components can be modeled by an arc with an optical gain, a fiber connection of the second components is modeled by an arc with an optical loss based on fiber attenuation, and a circuit pack of the second components is modeled by an arc with an optical loss based on insertion loss.

The power measurements can include at least two power measurements, and wherein the optical power is determined at a point utilized each of the at least two power measurements and traversing the graph accordingly and a scaling error is used to determine which of the at least two power measurements is used. The power measurements can include at least two power measurements with a first measurement and a second measurement, and the method can further include determining the optical power at a point by traversing the graph from the first measurement to the point and traversing the graph from the second measurement to the point; and determining an indication of improper operation of the node based on a divergence of the determined optical power based on the first measurement and the second measurement.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to systems and methods for dynamic data-driven power scaling in an optical node and network. Again, as described herein, typical photonic configurations (topologies) include a set of circuit packs laid out in a static, pre-defined formation. Based on the configuration, the present disclosure includes measurements scaled from one fixed point to another to allow for a controller to operate on a given topology. This approach removes the dependency of having predefined photonic topologies from the controllers. Specifically, the systems and methods include scaled power measurements at a component level, independent of configuration, enabling the ability to control any configuration of circuit packs. The use of the scaled power measurements is utilized in a software control scheme, via a controller, that allows circuit packs to be reconfigured or new circuit packs, without requiring new software code. Rather, the existing software code is adapted to support the reconfigured or new circuit packs, utilizing the scaled power measurements. Essentially, if circuit packs exist and can physically pass light in the configuration defined by the user, the scaled power measurements enable to control the power of channels going through them without exception.

The systems and methods provide efficiency and savings in development to support new circuit packs and new circuit pack configurations from existing circuit packs. With the increasing variety of circuit packs comes an ever-increasing number of ways that these circuit packs can be physically connected to each other to carry traffic. Conventionally, even if an arrangement of circuit packs can physically support carrying traffic, the current software does not support their ad-hoc configuration and thus is limited on how the circuit packs can be configured. Again, conventionally, these new circuit packs and new circuit pack configurations often force a new software release. The approach described herein removes the focus of topology/configuration control support from the specific software code.

Example Optical Node Configuration

Figure 1:
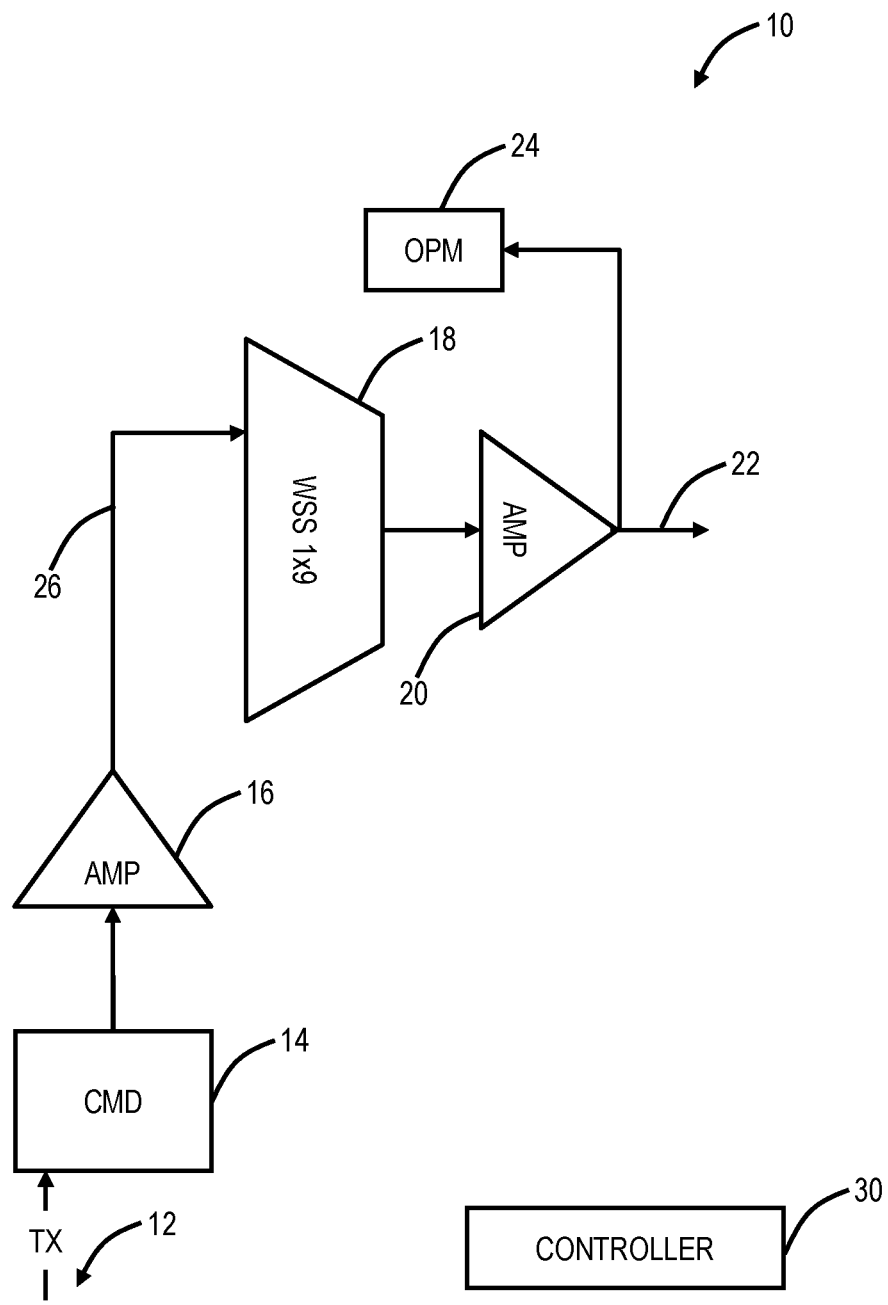
FIG. 1 is a block diagram of an example optical node configuration.

FIG. 1 is a block diagram of an example optical node 10 configuration. In this example, the optical node 10 is a ROADM and is illustrated with a single degree and a single transmitter 12. For illustration purposes, the FIGS. only illustrate a single direction (i.e., a transmit direction). However, those of ordinary skill in the art will recognize a practical bidirectional application will have a corresponding opposite direction (i.e., a receive direction). The transmitter 12 is configured to transmit an optical channel (which is a modulated optical signal) at a specific wavelength(s). The transmitter 12 connects to a Channel Multiplexer/Demultiplexer (CMD) 14 which is configured to combine the optical channel from the transmitter 12 with additional optical channels from other transmitters 12 (not shown in FIG. 1).

The CMD 14 connects to an amplifier 16, which is configured to provide power amplification to the multiplexed optical channels. The amplifier 16 can include an Erbium Doped Fiber Amplifier (EDFA), a Semiconductor Optical Amplifier (SOA), etc. The amplifier 16 connects to a Wavelength Selective Switch (WSS) 18, which is configured to switch optical channels to different degrees. In this example, the WSS 18 is a 1×9 device and can be realized via Microelectromechanical Mirrors (MEMS), Liquid Crystal, etc. The WSS 18 connects to a post-amplifier 20 which provides power amplifier prior to transmission to another optical node (not shown) via an optical fiber 22. An Optical Power Monitor (OPM) 24 is configured to monitor an output of the post amplifier 20, e.g., via an optical power tap. Finally, a controller 30 can be communicatively coupled to the various components, for monitoring and managing operations of the optical node 10.

As described herein, the components (12, 14, 16, 18, 20, 24) are implemented in hardware, i.e., circuit packs. For example, in an embodiment, the transmitter 12 may be in a circuit pack, the CMD 14 and the amplifier 16 may be in another circuit pack, the WSS 18 may be in yet another circuit pack, and the amplifier 20 and the OPM 24 may be in yet another circuit pack. Of course, other embodiments are contemplated.

Dynamically Finding Scaled Power Measurements

Typically, optical powers are scaled from one fixed point to another for control purposes. For example, in FIG. 1, the input power to the WSS 18 may be scaled from a transmitter port of the CMD 14 using the measured power at the transmitter 12, subtracting an Insertion Loss (IL) of the CMD 14, adding the gain of the amplifier 16 and subtracting the loss of an amplifier-WSS fiber 26. The power is measured at an output of the transmitter 12, and the remaining values can be determined in manufacturing or the like, and these values can be loaded in some memory in corresponding hardware (e.g., an EPROM, etc.). For example, these values (IL, gain, fiber loss, etc.) can be referred to as calibration data. These various values are provided to the controller 30 and utilized in control algorithms for managing the optical channel, e.g., adding the optical channel to the fiber 22.

Once the optical channel has been added, the power from after the WSS 18 at the OPM 24 is scaled back to the input of the WSS 18 to provide an approximation for the current input power. This approach is a supported configuration of circuit packs for power scaling, and static software code is written and maintained to support this. Fixed physical optical routes are used to scale power based on the provisioned configuration of the circuit packs. In addition, channel power measurements are only available to the end user at fixed points, and the formulas used to obtain these power measurements are predetermined.

Again, FIG. 1 is just one simple configuration, but in general, for a given port, the choice of power readings and source varies. The objective of the present disclosure is an approach that self-adapts to new circuit packs, topologies, and configurations. That is, FIG. 1 offers an example of a static approach that is written with static software code based on a given topology. The present disclosure provides an approach for scaling on demand and at any point of interest.

Dynamic Data Driven Power Scaling

The present disclosure includes a data-driven approach combined with a dynamic scaling for dynamic data-driven power scaling. The objective is to provide scaled power measurements to the controller 30 while eliminating software code churn.

The problem with current implementations is power is scaled statically and at a circuit pack level. This approach is fixed and does not support new circuit packs or reconfigurations of existing circuit packs. Instead, the present disclosure breaks the circuit packs down into their optical components. That is, the power measurements are managed at a component level, not at a circuit pack level. The controller 30 can then perform control based on the component connectivity as opposed to the circuit pack connectivity. This approach removes the software code churn in that a new topology or configuration can be introduced without new software code. The existing software code can support the new topology or configuration as the power measurements are at the component level.

In particular, any circuit pack or group of circuit packs can be modeled as a graph of arcs and vertices, containing gains/losses and point measurements. This graph can then be utilized to provide optical power measurements anywhere in a photonic network. In this manner, the controller 30 and its control can simply plug in the optical power measurements in the control, without requiring static configurations.

Figure 2:
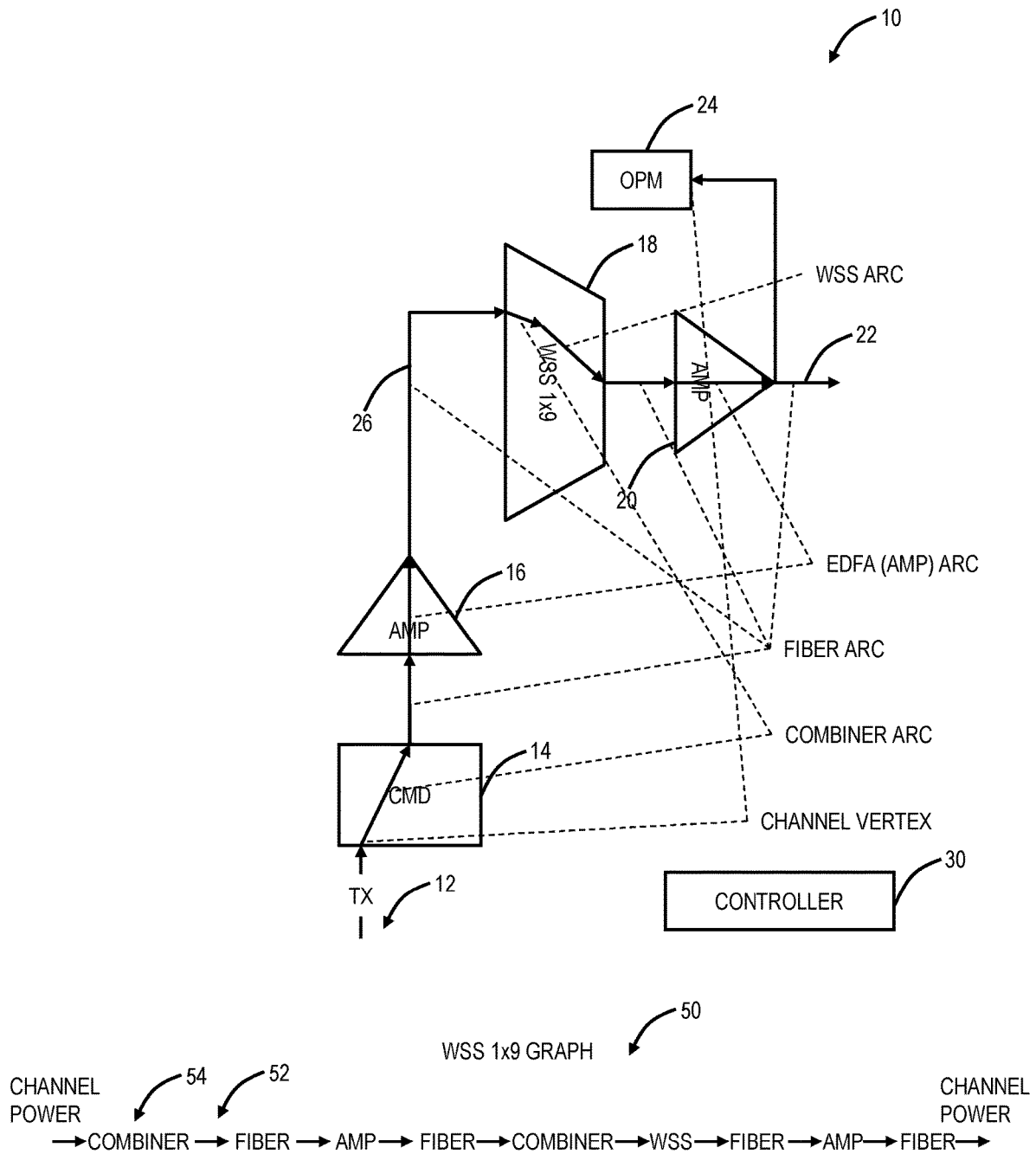
FIG. 2 is a block diagram of the example optical node configuration illustrating a break down to the component level for a graph of arcs and vertices.

FIG. 2 is a block diagram of the example optical node 10 configuration illustrating a break down to the component level for a graph 50 of arcs 52 and vertices 54. In the graph 50, the arcs 52 are directed edges which are indicative of the flow of optical channel(s) between the vertices 54 and each vertex 54 is a point where a power measurement is determined. In this example, there is a channel vertex 54 at the transmitter 12 and the OPM 24, i.e., two points where the optical channel power is measured or known. For example, the power is measured at the OPM 24 and may be known at the transmitter 12 based on corresponding settings. There are various arcs 52 in the graph 50 including various combiner arcs 52 in the CMD 14 and in the WSS 18, various fiber arcs 52 where there is interconnectivity between components, various amplifier arcs 52 in the amplifier 16 and in the amplifier 20, and a WSS arc 52 in the WSS 18.

The graph 50 is used to model the optical power of an optical channel through the node 10, or through any hardware configuration. Specifically, a vertex 54 is a point in the graph 50 where power is determined, measured, or computed, and an arc 52 is a directed edge in the graph 50 where power needs to be adjusted. For example, the arc 52 can cause a power increase such as in the amplifier arcs 52 due to gain or a power decrease such as in the combiner arc 52, the fiber arc 52, and the WSS arc 52 due to insertion loss, fiber attenuation, etc. The graph 50 can be managed by the controller 30, i.e., in memory.

By associating arcs 52 with a specific photonic component, the controller 30 can then "data-drive" their population. For example, amplifier type arcs 52 can have their gain populated via a query from the controller 30 to the circuit pack amplifier gain. For example, the amplifiers 16, 20 can provide a gain value to the controller 30. The combiner arcs 52 can have their loss values populated based on Card Calibration Table (CCT) data provided by the vendor from the factory. The WSS arc 52 can be obtained based on provisioned attenuation in the WSS 18. Finally, the fiber arcs 52 can be determined based on a computation of fiber type, distance, and a predetermined attenuation value. Alternatively, the fiber arcs 52 can be a fixed, predetermined value.

Other types of arcs 52 are also contemplated. The key aspect of an arc 52 is that optical power over the arc 52 can be determined based on known data. With the arcs 52 populated with an associated gain or loss, the channel power measurements can be determined anywhere along the graph 50 to provide per channel power measurements to be used by the controller 30.

Dynamic Power Scaling

The graph 50 can be a data structure that includes optical channels at the associated optical spectrum at the vertices 54 where there are measurements with the associated optical channel power. It is further possible to determine the total optical power at the vertices 54, based on the measured associated optical channel powers. The graph 50 further includes the arcs 52 that connect the vertices 54 via a direction, and each arc 52 includes a gain or loss for the optical powers. With the data in the graph 50, it is possible to "walk" the graph 50 to determine from a source vertex 54 to any other vertex 54 to get an associated power measurement. Again, historically, this power measurement was statically determined whenever a new configuration was supported, and new configurations required new code as the power source and path needed to be defined.

The graph 50 provides a dynamic approach breaking down all photonic components into a generic set of measurements, which are graph traversable. When a measurement is requested anywhere in the photonic network, the graph 50 is traversed in all directions stopping at a vertex 54 once a measurement source is located. While walking the graph 50, the scaled power measurement will accumulate a "scaling error" based on the components traversed during the walk. If multiple paths are found with which the power measurement could be scaled, the path with the lowest scaling error (or another weighting factor) could be used.

Optional equipment has never been leveraged to its full extent because of the static nature of our power scaling. As described herein, optional equipment can include monitor points that are physically equipped in the hardware configuration but not necessarily used in the static approach of power measurements. For example, OPMs connected to monitor ports of passive CMD type circuit packs provided little benefit besides additional channel power measurements that could be monitored. Using dynamic power scaling, this optional equipment could be used in photonic control. For example, this power measurement at these OPMs could be used to check the scaling error versus a scaled power measurement obtained via walking the graph 50.

Multisource Power Measurements

In an embodiment, the hardware configuration 100 may include at least two OPMs 24 to provide power measurements. The graph 50 can be traversed to compare and contrast values at the different OPMs 24, to determine the scaling error, etc. That is, in most instances, both per channel power measurements as well as total power measurements are available from multiple sources along the scaling graph 50. The graph 50 approach only requires a single source of measurement to provide power measurements. The multiple sources can be leveraged as a second source of data to improve photonic network operation.

In an embodiment, in the node 10, there can be measurement sources as follows: per channel optical power at the transmitter 12, per channel optical power and total optical power at the CMD 14, per channel optical power and total optical power at the WSS 18, and per channel optical power and total optical power at the OPM 24.

Early Circuit Pack Failure Detection

Second source power measurements could be used to detect circuit pack failures on circuit packs with control capabilities. For example, it could be possible to detect hardware failures in a WSS 18 circuit pack by scaling channel powers back across the WSS 18 to its input to compare with values scaled forward to this point. If the circuit pack was operating properly, these two values should be nearly identical, any divergence in these values could represent early indicators that the pack is beginning to fail.

Fault-Tolerant Power Scaling

With traditional power scaling, if a circuit pack in the desired power scaling path were to fail, controllers, in general, would freeze or stop controlling. With multiple sources for power measurements, there is an additional layer of protection for the controller 30.

For example, in a passthrough ROADM, if the demultiplexer WSS 18 were to fail, become non-responsive due to warm restart, or reside on a chassis (shelf) that has lost communication, it would not be able to provide power measurements to the multiplexer WSS 18. This would prevent channel additions through the node 10. Leveraging the second source of power measurements could scale back the power from the output of the WSS 18 to the input, allowing for the controller 30 to continue to make capacity changes through a site that is still optically healthy.

For the same ROADM configuration, any non-responsive circuit pack in the scaling path could prevent input power measurements from being detected as degraded. Since a failure in the pre-determined scaling path would prevent the calculation of channel input powers, the same approach above could be leveraged to ensure that faulted channels are identified whenever possible.

Fault Correction

In actual deployments, it is possible for the hardware state of circuit packs to fall out of synchronization with software provisioning. These cases are difficult to root cause and often require user intervention to remedy. By leveraging the data-driven approach and the ability to scale reference powers from multiple sources to a single point, this can be used to help identify and remedy faulty circuit pack provisioning.

Figure 3:
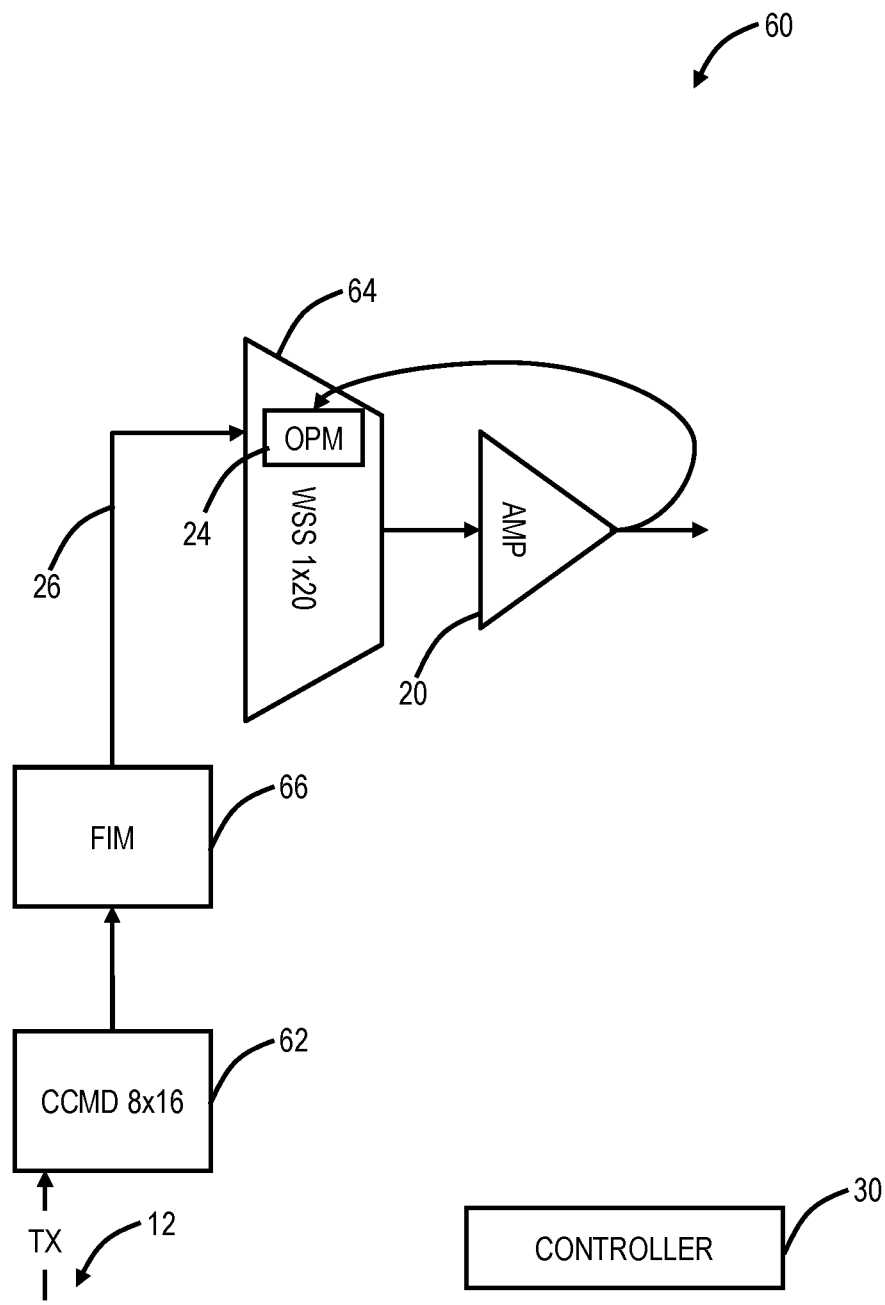
FIG. 3 is a block diagram of a node illustrating an example of fault correction based on the data-driven approach.

FIG. 3 is a block diagram of a node 60 illustrating an example of fault correction based on the data-driven approach. For example, in a Colorless, Directionless, and Contentionless (CDC) configuration of FIG. 3 with a Colorless Channel Multiplexer-Demultiplexer (CCMD) 62, WSS 64 (such as a 1×20 device), and Fiber Interface Module (FIM) 66 (which is a passive module providing fiber interconnectivity), traditionally the measured input power to the WSS 64 has been calculated by forward scaling the transmitter 12 power to the input of the WSS 64.

This value is not always accurate since it is possible that a Multicast Switch (MCS) in the CCMD 62 circuit pack could be mismatched with Shelf Processor (SP) provisioning, blocking all light from the Tx port from entering the WSS 64. In this case, the WSS 64 would freeze, an alarm would be raised, and this channel would not be added. Leveraging the second source of measurement from the OPM 64 module and scaled it back to the input of the WSS 64, it is possible to detect the mismatch in channel power. The graph 50 could then be traversed back out from the point of measurement and all configurable arcs 52 could have their provisioning pushed back to the related modules on their respective circuit packs. This same strategy could be leveraged to ensure proper provisioning of any configurable photonic module.

Measurement Quality

Since power scaled from one point should equal the power scaled from another. A quality indicator can be used/assigned to various power measurements. If the automated fault correction described above does not resolve the issues, the quality indicator can help to identify possible errors in provisioning, OPM drift, mis-fibering, etc.

Process

Figure 4:
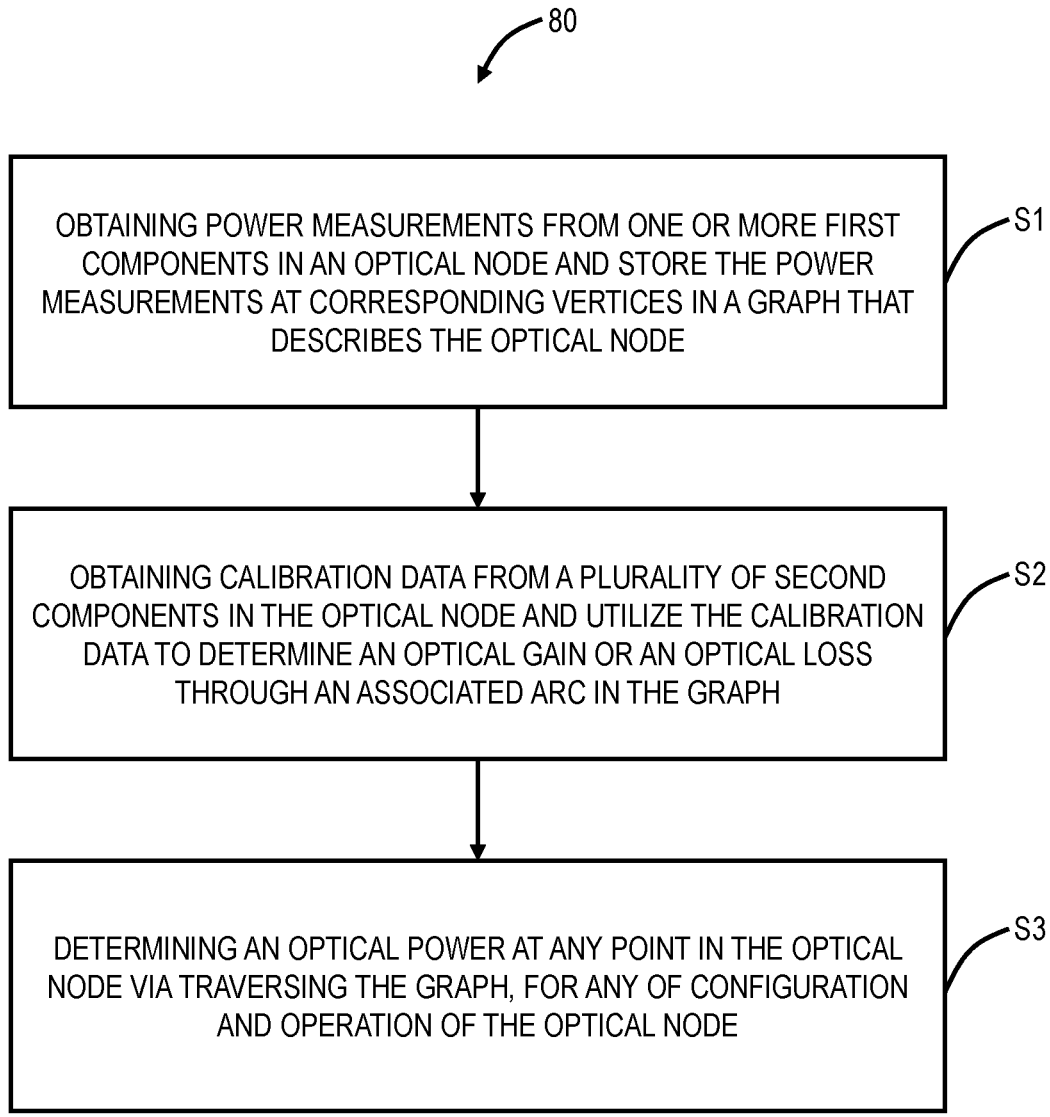
FIG. 4 is a flowchart of a process for a data-driven approach to determine optical power in an optical node.

FIG. 4 is a flowchart of a process 80 for a data-driven approach to determine optical power in an optical node. The process 80 includes obtaining power measurements from one or more first components in an optical node and store the power measurements at corresponding vertices in a graph that describes the optical node (step S1); obtaining calibration data from a plurality of second components in the optical node and utilize the calibration data to determine an optical gain or an optical loss through an associated arc in the graph (step S2); and determining an optical power at any point in the optical node via traversing the graph, for any of configuration and operation of the optical node (step S3). The graph includes the vertices that are points in the optical node where there is a need for optical power, the arcs that are connections through the optical node where the optical power has the optical gain or the optical loss, and optical channels and their associated optical spectrum.

The power measurements can include per optical channel power and total optical power, and wherein the graph can further include data denoting optical channels present and their associated optical spectrum. An amplifier component of the second components can be modeled by an arc with an optical gain, a fiber connection of the second components can be modeled by an arc with an optical loss based on fiber attenuation, and a circuit pack of the second components can be modeled by an arc with an optical loss based on insertion loss.

The power measurements can include at least two power measurements, and wherein the optical power is determined at a point utilized each of the at least two power measurements and traversing the graph accordingly, and a scaling error is used to determine which of the at least two power measurements is used. The power measurements can include at least two power measurements with a first measurement and a second measurement, and the process 80 can further include determining the optical power at a point by traversing the graph from the first measurement to the point and traversing the graph from the second measurement to the point; and determining an indication of improper operation of the node based on a divergence of the determined optical power based on the first measurement and the second measurement. The calibration data can include any of insertion loss, gain, attenuation, and fiber loss.

Example Hardware Configuration

Figure 5:
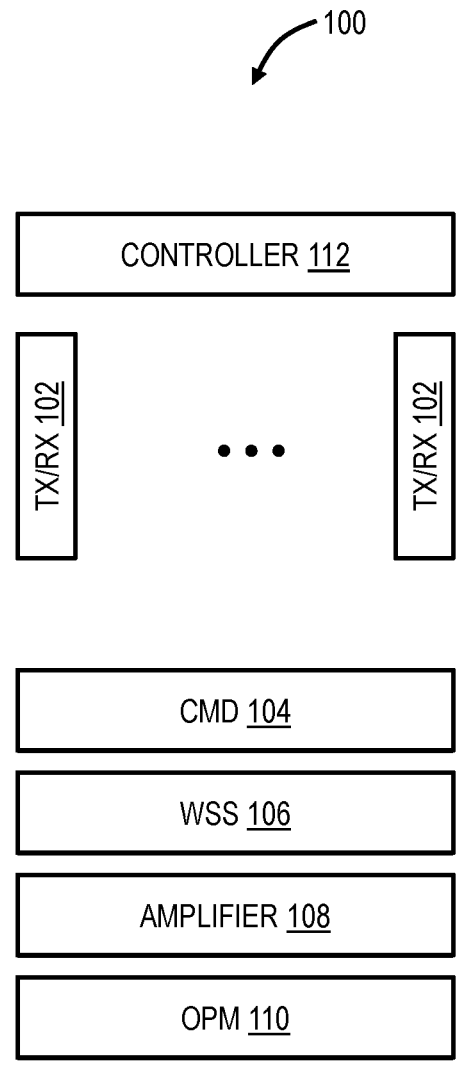
FIG. 5 is a block diagram of a hardware configuration for the optical node of FIG. 1.

FIG. 5 is a block diagram of a hardware configuration 100 for the optical node 10. In an embodiment, the node 10 can be a network element that may consolidate the functionality of a Multi-Service Provisioning Platform (MSPP), Digital Cross-Connect (DCS), Ethernet and/or Optical Transport Network (OTN) switch, Wave Division Multiplexed (WDM)/Dense WDM (DWDM) platform, Packet Optical Transport System (POTS), etc. into a single, high-capacity intelligent switching system providing Layer 0, 1, 2, and/or 3 consolidation. In another embodiment, the node 10 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a Wavelength Division Multiplexing (WDM) terminal, an access/aggregation device, etc. That is, the node 10 can be a system with ingress and egress digital and/or optical signals and switching of channels, timeslots, tributary units, etc. Also, the node 10 can be a system with ingress and egress of optical signals and switching/routing of wavelengths. Of course, the node 10 can combine both digital signals and optical signals.

The hardware configuration 100 can include transmitters/receiver circuit packs 102, a CMD circuit pack 104, a WSS circuit pack 106, an amplifier circuit pack 108, an OPM circuit pack 110, and a controller circuit pack 112. Of course, other embodiments can include more or less of the circuit packs, configurations where the functions in some of the circuit packs are combined, etc. The transmitters/receiver circuit packs 102 can include optical transceivers. Further, the transmitters/receiver circuit packs 102 can include a plurality of optical connections per pack. The transmitters/receiver circuit packs 102 can include wavelength division multiplexing interfaces, short reach interfaces, and the like, and can connect to other transmitters/receiver circuit packs 102 on remote nodes, end clients, edge routers, and the like, e.g., forming connections on links in a network.

The controller 112 is communicatively coupled to the transmitters/receiver circuit packs 102, the CMD circuit pack 104, the WSS circuit pack 106, the amplifier circuit pack 108, the OPM circuit pack 110, and the controller circuit pack 112. The controller 112 can perform Operations, Administration, Maintenance, and Provisioning (OAM&P) functions for the optical node 10. This can include configuring, managing, and monitoring operations of these components.

Those of ordinary skill in the art will recognize the hardware configuration 100 can include other components which are omitted for illustration purposes, and that the systems and methods described herein are contemplated for use with a plurality of different network elements with the hardware configuration 100 presented as an example of a type of network element. In general, the systems and methods described herein contemplate use with any network element providing optical connections.

Controller

Figure 6:
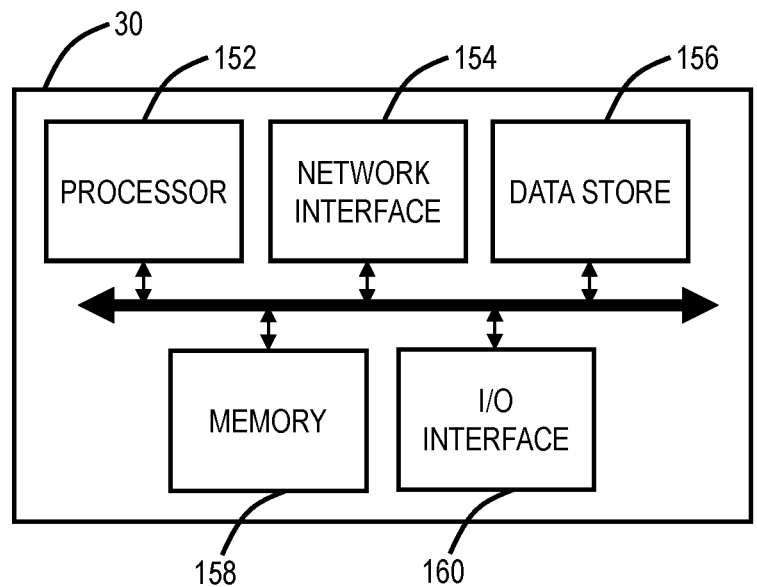
FIG. 6 is a block diagram of an example implementation of a controller.

FIG. 6 is a block diagram of an example implementation of the controller 30. The controller 30 can be part of the common equipment, such the controller circuit pack 112, part of one of the other circuit packs in the hardware configuration 100, a stand-alone device communicatively coupled to the node 10, etc. For example, the controller 30 can be used to manage optical power through the hardware configuration 100 utilizing the graph 50. The controller 30 can include a processor 152, which is a hardware device for executing software instructions. The processor 152 can be any custom made or commercially available processor, a central processing unit (CPU), an auxiliary processor among several processors associated with the controller 30, a semiconductor-based microprocessor (in the form of a microchip or chip set), or generally any device for executing software instructions. When the controller 30 is in operation, the controller 30 is configured to execute software stored within the memory, to communicate data to and from memory 158, and to generally control operations of the controller 30 pursuant to the software instructions. The controller 30 can also include a network interface 154, a data store 156, memory 158, an I/O interface 160, and the like, all of which are communicatively coupled to one another and to the processor 152.

The network interface 154 can be used to enable the controller 30 to communicate on a network. The network interface 154 can include, for example, an Ethernet card or a wireless local area network (WLAN) card. The network interface 154 can include address, control, and/or data connections to enable appropriate communications on the network. The data store 156 can be used to store data, such as control plane information, provisioning data, OAM&P data, etc. The data store 156 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 156 can incorporate electronic, magnetic, optical, and/or other types of storage media. The memory 158 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 158 may incorporate electronic, magnetic, optical, and/or other types of storage media. Note that the memory 158 can have a distributed architecture, where various components are situated remotely from one another but may be accessed by the processor 152. An I/O interface 160 includes components for the controller 30 to communicate with other devices, such as other circuit packs.

In an embodiment, the memory 158 stores instructions that, when executed, cause the processor 152 to obtain power measurements from one or more first components in an optical node and store the power measurements at corresponding vertices in a graph that describes the optical node, obtain calibration data from a plurality of second components in the optical node and utilize the calibration data to determine an optical gain or an optical loss through an associated arc in the graph, and determine an optical power at any point in the optical node via traversing the graph, for any of configuration and operation of the optical node. The graph includes the vertices that are points in the optical node where there is a need for optical power, the arcs that are connections through the optical node where the optical power has the optical gain or the optical loss, and optical channels and their associated optical spectrum.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An apparatus comprising:
a processor and memory storing instructions that, when executed, cause the processor to
obtain power measurements from one or more first components in an optical node and store the power measurements at corresponding vertices in a graph that describes the optical node, wherein the power measurements include at least two power measurements with a first measurement and a second measurement,
obtain calibration data from a plurality of second components in the optical node and utilize the calibration data to determine an optical gain or an optical loss through an associated arc in the graph,
determine an optical power at any point in the optical node via traversing the graph, for any of configuration and operation of the optical node, wherein the optical power is determined at the point by traversing the graph from the first measurement to the point and traversing the graph from the second measurement to the point, and
determine an indication of improper operation of the node based on a divergence of the determined optical power based on the first measurement and the second measurement.

2. The apparatus of claim 1, wherein the graph includes the vertices that are points in the optical node where there is a need for optical power, the arcs that are connections through the optical node where the optical power has the optical gain or the optical loss, and optical channels and their associated optical spectrum.

3. The apparatus of claim 1, wherein the power measurements include per optical channel power and total optical power, and wherein the graph further includes data denoting optical channels present and their associated optical spectrum.

4. The apparatus of claim 1, wherein an amplifier component of the second components is modeled by an arc with an optical gain, a fiber connection of the second components is modeled by an arc with an optical loss based on fiber attenuation, and a circuit pack of the second components is modeled by an arc with an optical loss based on insertion loss.

5. The apparatus of claim 1, wherein a scaling error is used to determine which of the at least two power measurements is used.

6. The apparatus of claim 1, wherein the calibration data includes any of insertion loss, gain, attenuation, and fiber loss.

7. A non-transitory computer-readable medium comprising instructions that, when executed, cause a processor to perform the steps of:
obtaining power measurements from one or more first components in an optical node and store the power measurements at corresponding vertices in a graph that describes the optical node, wherein the power measurements include at least two power measurements with a first measurement and a second measurement;
obtaining calibration data from a plurality of second components in the optical node and utilize the calibration data to determine an optical gain or an optical loss through an associated arc in the graph;
determining an optical power at any point in the optical node via traversing the graph, for any of configuration and operation of the optical node, wherein the optical power is determined at the point by traversing the graph from the first measurement to the point and traversing the graph from the second measurement to the point; and
determine an indication of improper operation of the node based on a divergence of the determined optical power based on the first measurement and the second measurement.

8. The non-transitory computer-readable medium of claim 7, wherein the graph includes the vertices that are points in the optical node where there is a need for optical power, the arcs that are connections through the optical node where the optical power has the optical gain or the optical loss, and optical channels and their associated optical spectrum.

9. The non-transitory computer-readable medium of claim 7, wherein the power measurements include per optical channel power and total optical power, and wherein the graph further includes data denoting optical channels present and their associated optical spectrum.

10. The non-transitory computer-readable medium of claim 7, wherein an amplifier component of the second components is modeled by an arc with an optical gain, a fiber connection of the second components is modeled by an arc with an optical loss based on fiber attenuation, and a circuit pack of the second components is modeled by an arc with an optical loss based on insertion loss.

11. The non-transitory computer-readable medium of claim 7, wherein a scaling error is used to determine which of the at least two power measurements is used.

12. The non-transitory computer-readable medium of claim 7, wherein the calibration data includes any of insertion loss, gain, attenuation, and fiber loss.

13. A non-transitory computer-readable medium comprising instructions that, when executed, cause a processor to perform the steps of:
obtaining power measurements from one or more first components in an optical node and store the power measurements at corresponding vertices in a graph that describes the optical node;
obtaining calibration data from a plurality of second components in the optical node and utilize the calibration data to determine an optical gain or an optical loss through an associated arc in the graph; and
determining an optical power at any point in the optical node via traversing the graph, for any of configuration and operation of the optical node,
wherein an amplifier component of the second components is modeled by an arc with an optical gain, a fiber connection of the second components is modeled by an arc with an optical loss based on fiber attenuation, and a circuit pack of the second components is modeled by an arc with an optical loss based on insertion loss.

14. The non-transitory computer-readable medium of claim 13, wherein the graph includes the vertices that are points in the optical node where there is a need for optical power, the arcs that are connections through the optical node where the optical power has the optical gain or the optical loss, and optical channels and their associated optical spectrum.

15. The non-transitory computer-readable medium of claim 13, wherein the power measurements include per optical channel power and total optical power, and wherein the graph further includes data denoting optical channels present and their associated optical spectrum.

16. The non-transitory computer-readable medium of claim 13, wherein the power measurements include at least two power measurements, and wherein the optical power is determined at a point utilizing each of the at least two power measurements and traversing the graph accordingly and a scaling error is used to determine which of the at least two power measurements is used.

17. The non-transitory computer-readable medium of claim 13, wherein the power measurements include at least two power measurements with a first measurement and a second measurement, and wherein the instructions that, when executed, further cause the processor to perform the steps of
determining the optical power at a point by traversing the graph from the first measurement to the point and traversing the graph from the second measurement to the point; and
determining an indication of improper operation of the node based on a divergence of the determined optical power based on the first measurement and the second measurement.

18. The non-transitory computer-readable medium of claim 13, wherein the calibration data includes any of insertion loss, gain, attenuation, and fiber loss.

* * * * *